(12) United States Patent
Lee et al.

(10) Patent No.: US 11,499,006 B2
(45) Date of Patent: Nov. 15, 2022

(54) POLYMER COMPOUND, SOLID ELECTROLYTE FILM INCLUDING THE SAME, AND LITHIUM-AIR BATTERY INCLUDING THE SOLID ELECTROLYTE FILM

(71) Applicants: Samsung Electronics Co., Ltd., Suwon-si (KR); MASSACHUSETTS INSTITUTE OF TECHNOLOGY, Cambridge, MA (US)

(72) Inventors: Dongjoon Lee, Suwon-si (KR); Jeremiah A Johnson, Cambridge, MA (US); Mingjun Huang, Cambridge, MA (US); Shuting Feng, Cambridge, MA (US); Wenxu Zhang, Cambridge, MA (US); Hyukjae Kwon, Suwon-si (KR); Mokwon Kim, Suwon-si (KR); Taeyoung Kim, Seoul (KR); Yang Shao-Horn, Cambridge, MA (US); Livia Giordano, Newton, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 786 days.

(21) Appl. No.: 16/441,300

(22) Filed: Jun. 14, 2019

(65) Prior Publication Data
US 2019/0382525 A1    Dec. 19, 2019

Related U.S. Application Data

(60) Provisional application No. 62/685,263, filed on Jun. 14, 2018.

(30) Foreign Application Priority Data

Nov. 30, 2018  (KR) .................. 10-2018-0153008

(51) Int. Cl.
*H01M 12/06*  (2006.01)
*C08G 61/08*  (2006.01)

(52) U.S. Cl.
CPC ............ *C08G 61/08* (2013.01); *H01M 12/06* (2013.01); *C08G 2261/1452* (2013.01);
(Continued)

(58) Field of Classification Search
CPC ..................................................... H01M 12/06
See application file for complete search history.

(56) References Cited

U.S. PATENT DOCUMENTS 6,210,832 B1    4/2001   Visco et al.
6,987,150 B2    1/2006   Kurth et al.
(Continued)

FOREIGN PATENT DOCUMENTS

JP    2016508168 A    3/2016
KR    1020030003766 A    1/2003
KR    1020170086117 A    7/2017

OTHER PUBLICATIONS

STIC Search (Year: 2022).*
(Continued)

*Primary Examiner* — Brian R Ohara
(74) *Attorney, Agent, or Firm* — Cantor Colburn LLP

(57) ABSTRACT

A polymer compound including a repeating unit represented by Formula:
(Continued)

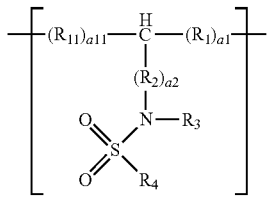

Formula 1 wherein $R_1$, $R_2$, $R_3$, $R_4$, a1, a2, and a11 in Formula 1 are as defined in the specification.

20 Claims, 4 Drawing Sheets

(52) U.S. Cl.
CPC .............. *C08G 2261/3322* (2013.01); *C08G 2261/418* (2013.01); *H01M 2300/0082* (2013.01); *H01M 2300/0094* (2013.01)

(56) References Cited

U.S. PATENT DOCUMENTS 9,663,600 B2    5/2017  Yang et al.
2017/0365870 A1  12/2017  Schaberg et al.

OTHER PUBLICATIONS

Shi-Tao Fu et al., "N,N-dialkyl perfluoroalkanesulfonamides: Synthesis, characterization and properties," Journal of Fluorine Chemistry, vol. 147, Jan. 17, 2013, pp. 56-64.

Stefan A. Freunberger et al., "The Lithium-Oxygen Battery with Ether-Based Electrolytes," Angew. Chem. Int. Ed., Jul. 29, 2011, vol. 50, Issue 37, pp. 8609-8613.

Yves Choquette et al., "Sulfamides and Glymes as Aprotic Solvents for Lithium Batteries," J. Electrochemical Soc., vol. 145, No. 10, Oct. 1998, pp. 3500-3507.

* cited by examiner

POLYMER COMPOUND, SOLID ELECTROLYTE FILM INCLUDING THE SAME, AND LITHIUM-AIR BATTERY INCLUDING THE SOLID ELECTROLYTE FILM

CROSS-REFERENCE TO RELATED APPLICATION

This application claims priority to and the benefit of U.S. Provisional Patent Application No. 62/685,263, filed on Jun. 14, 2018, and Korean Patent Application No. 10-2018-0153008, filed on Nov. 30, 2018, in the Korean Intellectual Property Office, the contents of which are incorporated herein by reference in their entirety.

BACKGROUND

1. Field

The present disclosure relates to a polymer compound, a solid electrolyte film including the polymer compound, and a lithium-air battery including the solid electrolyte film.

2. Description of the Related Art

A lithium-air battery includes a negative electrode which allows intercalation/deintercalation of lithium ions, a positive electrode at which oxidation/reduction of oxygen occurs, and a lithium-ion conducting medium between the positive electrode and the negative electrode.

A lithium-air battery may use lithium metal as the negative electrode, and oxygen present in the air does not need to be stored as a positive active material within the battery. Accordingly, a lithium-air battery may be a high-capacity battery. Such a lithium-air battery has a theoretical energy density per unit weight of about 3500 watt hours per kilogram (Wh/kg) or greater, which is at least about 10 times greater than the theoretical energy density per unit weight of a common lithium ion battery.

A lithium-air battery including a liquid electrolyte may have an increased cell weight since pores of the positive electrode are filled with the lithium electrolyte. This may hinder manufacture of a lithium-air battery having a high-energy density. To solve these issues, efforts have been made to use a solid electrolyte in the positive electrode.

A positive electrode including a solid electrolyte may include, in addition to the solid electrolyte, a conductive material and the like, such that a contact area between the solid electrolyte in the positive electrode and the lithium-ion conducting medium may be reduced, and the positive electrode may have an uneven surface, resulting in increased interfacial resistance between the positive electrode and the lithium-ion conducting medium. Accordingly, there is a need for a method of reducing interfacial resistance between a positive electrode and a lithium-ion conducting medium.

SUMMARY

Provided is a polymer compound having a novel structure, a solid electrolyte film including the polymer compound, and a lithium-air battery including the solid electrolyte film.

Additional aspects will be set forth, in part, in the description which follows and, in part, will be apparent from the description, or may be learned by practice of the presented embodiments.

According to an aspect of an embodiment, a polymer compound includes a repeating unit represented by Formula 1:

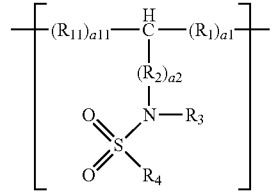

Formula 1 wherein, in Formula 1, $R_1$ and $R_{11}$ are each independently a single bond or a substituted or unsubstituted $C_1$-$C_{30}$ alkylene group, $R_2$ is a substituted or unsubstituted $C_1$-$C_{10}$ alkylene group, a substituted or unsubstituted $C_2$-$C_{10}$ alkenylene group, a substituted or unsubstituted $C_3$-$C_{10}$ cycloalkylene group, a substituted or unsubstituted $C_3$-$C_{10}$ cycloalkenylene group, a substituted or unsubstituted $C_6$-$C_{10}$ arylene group, or a substituted or unsubstituted divalent non-aromatic condensed polycyclic group, $R_3$ is hydrogen, a substituted or unsubstituted $C_1$-$C_{10}$ alkyl group, a substituted or unsubstituted $C_3$-$C_{10}$ cycloalkyl group, a substituted or unsubstituted $C_3$-$C_{10}$ cycloalkenyl group, a substituted or unsubstituted $C_6$-$C_{10}$ aryl group, or a substituted or unsubstituted monovalent non-aromatic condensed polycyclic group, $R_4$ is hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_3$-$C_{10}$ cycloalkyl group, a substituted or unsubstituted $C_3$-$C_{10}$ cycloalkenyl group, a substituted or unsubstituted $C_6$-$C_{10}$ aryl group, a substituted or unsubstituted monovalent non-aromatic condensed polycyclic group, or —N($R_5$)($R_6$), $R_5$ and $R_6$ are each independently hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_1$-$C_{10}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{10}$ aryl group, a substituted or unsubstituted $C_6$-$C_{10}$ aryloxy group, a substituted or unsubstituted $C_6$-$C_{10}$ arylthio group, a substituted or unsubstituted $C_1$-$C_{10}$ heteroaryl group, a substituted or unsubstituted monovalent non-aromatic condensed polycyclic group, or a substituted or unsubstituted monovalent non-aromatic condensed heteropolycyclic group, a1 and a11 are each independently an integer of 1 to 30, wherein, when a1 is 2 or greater, each $R_1$ is independently the same or different as another $R_1$, and when a11 is 2 or greater, each $R_{11}$ is independently the same or different as another $R_{11}$, and a2 is an integer selected from 1 to 10, and when a2 is 2 or greater, each $R_2$ is independently the same or different as another $R_2$.

According to an aspect of another embodiment, a solid electrolyte film includes the above-described polymer.

According to an aspect of another embodiment, a lithium-air battery includes: a positive electrode; a negative electrode; and a solid electrolyte film between the positive electrode and the negative electrode, the solid electrolyte film including the above-described polymer compound.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
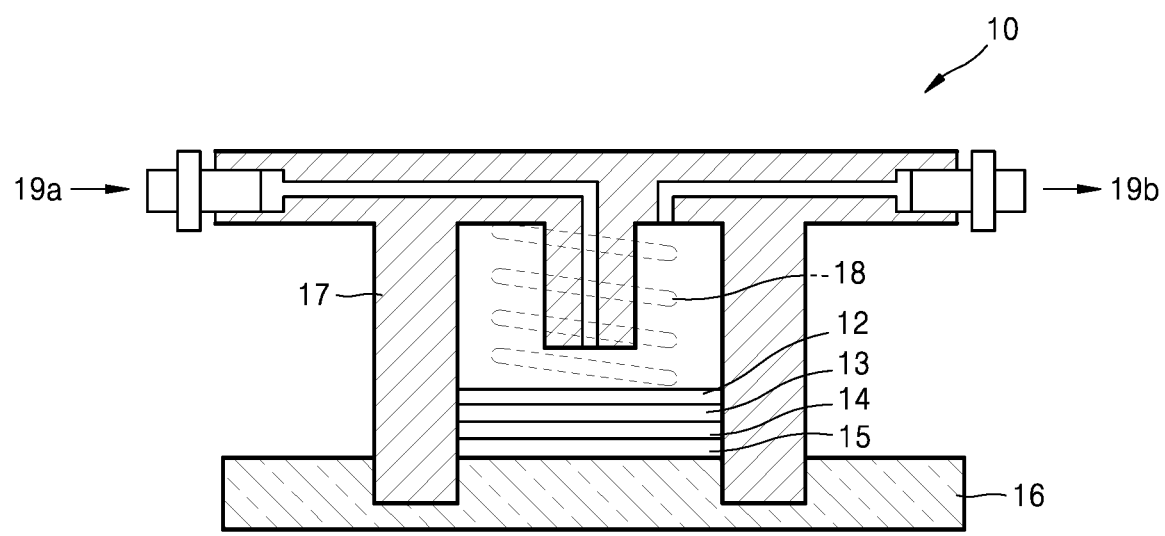
FIG. 1 is a schematic view illustrating a structure of a lithium-air battery, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect of the disclosure, a polymer compound includes a repeating unit represented by Formula 1.

Formula 1

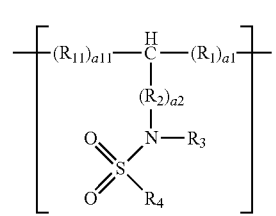

In Formula 1, $R_1$ and $R_{11}$ may each independently be a single bond or a substituted or unsubstituted $C_1$-$C_{30}$ alkylene group, $R_2$ may be a substituted or unsubstituted $C_1$-$C_{10}$ alkylene group, a substituted or unsubstituted $C_2$-$C_{10}$ alkenylene group, a substituted or unsubstituted $C_3$-$C_{10}$ cycloalkylene group, a substituted or unsubstituted $C_3$-$C_{10}$ cycloalkenylene group, a substituted or unsubstituted $C_6$-$C_{10}$ arylene group, or a substituted or unsubstituted divalent non-aromatic condensed polycyclic group, $R_3$ may be hydrogen, a substituted or unsubstituted $C_1$-$C_{10}$ alkyl group, a substituted or unsubstituted $C_3$-$C_{10}$ cycloalkyl group, a substituted or unsubstituted $C_3$-$C_{10}$ cycloalkenyl group, a substituted or unsubstituted $C_6$-$C_{10}$ aryl group, or a substituted or unsubstituted monovalent non-aromatic condensed polycyclic group, $R_4$ may be hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_3$-$C_{10}$ cycloalkyl group, a substituted or unsubstituted $C_3$-$C_{10}$ cycloalkenyl group, a substituted or unsubstituted $C_6$-$C_{10}$ aryl group, or a substituted or unsubstituted monovalent non-aromatic condensed polycyclic group, and —$N(R_5)(R_6)$, $R_5$ and $R_6$ may each independently be hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_1$-$C_{10}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{10}$ aryl group, a substituted or unsubstituted $C_6$-$C_{10}$ aryloxy group, a substituted or unsubstituted $C_6$-$C_{10}$ arylthio group, a substituted or unsubstituted $C_1$-$C_{10}$ heteroaryl group, a substituted or unsubstituted monovalent non-aromatic condensed polycyclic group, or a substituted or unsubstituted monovalent non-aromatic condensed heteropolycyclic group, a1 and a11 may each independently be an integer of 1 to 30, wherein, when a1 is 2 or greater, each $R_1$ may be independently the same or different as another $R_1$, and when $R_{11}$ is 2 or greater, each $R_{11}$ may be independently the same or different as another $R_{11}$, and a2 may be an integer selected from 1 to 10, and when a2 is 2 or greater each $R_2$ may be independently the same or different as another $R_2$.

A substituent in the substituted $C_1$-$C_{10}$ alkyl group, the substituted $C_2$-$C_{10}$ alkenyl group, the substituted $C_2$-$C_{10}$ alkynyl group, the substituted $C_1$-$C_{10}$ alkoxy group, the substituted $C_3$-$C_{10}$ cycloalkyl group, the substituted $C_1$-$C_{10}$ heterocycloalkyl group, the substituted $C_3$-$C_{10}$ cycloalkenyl group, the substituted $C_1$-$C_{10}$ heterocycloalkenyl group, the substituted $C_6$-$C_{10}$ aryl group, the substituted $C_6$-$C_{10}$ aryloxy group, the substituted $C_6$-$C_{10}$ arylthio group, the substituted $C_1$-$C_{10}$ heteroaryl group, the substituted monovalent non-aromatic condensed polycyclic group, the substituted monovalent non-aromatic condensed heteropolycyclic group, the substituted $C_1$-$C_{30}$ alkylene group, the substituted $C_2$-$C_{10}$ alkenylene group, the substituted $C_3$-$C_{10}$ cycloalkylene group, the substituted $C_3$-$C_{10}$ cycloalkenylene group, the substituted $C_6$-$C_{10}$ arylene group, or the substituted divalent non-aromatic condensed polycyclic group, may be at least one of:

deuterium (-D), —F, —Cl, —Br, —I, a hydroxyl group (—OH), a cyano group (—C≡N), a nitro group (—NO$_2$), an amidino group (—C(=NH)NH$_2$), a hydrazino group (—N$_2$H$_4$), a hydrazono group (—C=NNH$_2$), a $C_1$-$C_{10}$ alkyl group, a $C_2$-$C_{10}$ alkenyl group, a $C_2$-$C_{10}$ alkynyl group, or a $C_1$-$C_{10}$ alkoxy group;

a substituted $C_1$-$C_{10}$ alkyl group, a substituted $C_2$-$C_{10}$ alkenyl group, a substituted $C_2$-$C_{10}$ alkynyl group, or a substituted $C_1$-$C_{10}$ alkoxy group, each of which is independently substituted with at least one of deuterium, —F, —Cl, —Br, —I, a hydroxyl group, a cyano group, a nitro group, an amidino group, a hydrazino group, a hydrazono group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{10}$ aryl group, a $C_6$-$C_{10}$ aryloxy group, a $C_6$-$C_{10}$ arylthio group, a $C_1$-$C_{10}$ heteroaryl group, a monovalent non-aromatic condensed polycyclic group, or a monovalent non-aromatic condensed heteropolycyclic group;

a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{10}$ aryl group, a $C_6$-$C_{10}$ aryloxy group, a $C_6$-$C_{10}$ arylthio group, a $C_1$-$C_{10}$ heteroaryl group, a monovalent non-aromatic condensed polycyclic group, or a monovalent non-aromatic condensed heteropolycyclic group; a substituted $C_3$-$C_{10}$ cycloalkyl group, a substituted $C_1$-$C_{10}$ heterocycloalkyl group, a substituted $C_3$-$C_{10}$ cycloalkenyl group, a substituted $C_1$-$C_{10}$ heterocycloalkenyl group, a substituted $C_6$-$C_{10}$ aryl group, a substituted $C_6$-$C_{10}$ aryloxy group, a substituted $C_6$-$C_{10}$ arylthio group, a substituted $C_1$-$C_{10}$ heteroaryl group, a substituted monovalent non-aromatic condensed polycyclic group, or a substituted monovalent non-aromatic condensed heteropolycyclic group, each of which is independently substituted with at least one of deuterium, —F, —Cl, —Br, —I, a hydroxyl group, a cyano group, a nitro group, an amidino group, a hydrazino group, a hydrazono group, a $C_1$-$C_{10}$ alkyl group, a $C_2$-$C_{10}$ alkenyl group, a $C_2$-$C_{10}$ alkynyl group, a $C_1$-$C_{10}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{10}$ aryl group, a $C_6$-$C_{10}$ aryloxy group, a $C_6$-$C_{10}$ arylthio group, a $C_1$-$C_{10}$ heteroaryl group, a monovalent non-aromatic condensed polycyclic group, or a monovalent non-aromatic condensed heteropolycyclic group; or

—N(Q$_1$)(Q$_2$), wherein $Q_1$ and $Q_2$ may each independently be hydrogen, deuterium, —F, —Cl, —Br, —I, a hydroxyl group, a cyano group, a nitro group, an amidino group, a hydrazino group, a hydrazono group, a $C_1$-$C_{10}$ alkyl group, a $C_2$-$C_{10}$ alkenyl group, a $C_2$-$C_{10}$ alkynyl group, a $C_1$-$C_{10}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{10}$ aryl group, a $C_1$-$C_{10}$ heteroaryl group, a monovalent non-aromatic condensed polycyclic group, a monovalent non-aromatic condensed heteropolycyclic group, a biphenyl group, or a terphenyl group.

In one or more embodiments, one of $(R_{11})_{a11}$ or $(R_1)_{a1}$ may be a methylene group. However, embodiments are not limited thereto.

In one or more embodiments, (i) $(R_{11})_{a11}$ may be a methylene group, and $(R_1)_{a1}$ may be an ethylene group, a propylene group, a butylene group, a pentylene group, or a hexylene group, or (ii) $(R_1)_{a1}$ may be a methylene group, and $(R_{11})_{a11}$ may be an ethylene group, a propylene group, a butylene group, a pentylene group, or a hexylene group.

In one or more embodiments, $R_2$ may be a substituted or unsubstituted $C_1$-$C_{10}$ alkylene group. However, embodiments are not limited thereto. For example, $R_2$ may be a methylene group, an ethylene group, a propylene group, a butylene group, a pentylene group, or a hexylene group.

For example, $(R_2)_{a2}$ may be a methylene group, an ethylene group, a propylene group, a butylene group, a pentylene group, or a hexylene group.

In one or more embodiments, $R_3$ may be hydrogen or a substituted or unsubstituted $C_1$-$C_{10}$ alkyl group. However, embodiments are not limited thereto. For example, $R_3$ may be hydrogen, a methyl group, an ethyl group, an n-propyl group, an iso-propyl group, an n-butyl group, a sec-butyl group, an iso-butyl group, a tert-butyl group, a pentyl group, or a hexyl group. For example, $R_3$ may be a methyl group, an ethyl group, an n-propyl group, an iso-propyl group, an n-butyl group, a sec-butyl group, an iso-butyl group, or a tert-butyl group.

In one or more embodiments, $R_4$ may be hydrogen, a substituted or unsubstituted $C_1$-$C_{10}$ alkyl group, or —N(R$_5$)(R$_6$), and $R_5$ and $R_6$ may each independently be hydrogen or a substituted or unsubstituted $C_1$-$C_{10}$ alkyl group.

For example, $R_4$ may be:

a methyl group, an ethyl group, an n-propyl group, an iso-propyl group, an n-butyl group, a sec-butyl group, an iso-butyl group, a tert-butyl group, a pentyl group, or a hexyl group;

a substituted methyl group, a substituted ethyl group, a substituted n-propyl group, a substituted iso-propyl group, a substituted n-butyl group, a substituted sec-butyl group, a substituted iso-butyl group, a substituted tert-butyl group, a substituted pentyl group, or a substituted hexyl group, each independently substituted with at least one of deuterium (-D), —F, —Cl, —Br, —I, a methyl group, an ethyl group, an n-propyl group, an iso-propyl group, an n-butyl group, a sec-butyl group, an iso-butyl group, a tert-butyl group, a pentyl group, or a hexyl group; or

—N($R_5$)($R_6$), wherein $R_5$ and $R_6$ may each independently be hydrogen, a methyl group, an ethyl group, an n-propyl group, an iso-propyl group, an n-butyl group, a sec-butyl group, an iso-butyl group, a tert-butyl group, a pentyl group, or a hexyl group.

For example, $R_4$ may be:

a methyl group, an ethyl group, an n-propyl group, an iso-propyl group, an n-butyl group, a sec-butyl group, an iso-butyl group, or a tert-butyl group;

a substituted methyl group, a substituted ethyl group, a substituted n-propyl group, a substituted iso-propyl group, a substituted n-butyl group, a substituted sec-butyl group, a substituted iso-butyl group, or a substituted tert-butyl group, each independently substituted with at least one of —F, —Cl, —Br, or —I; or

—N($R_5$)($R_6$), wherein $R_5$ and $R_6$ may each independently be selected from hydrogen, a methyl group, an ethyl group, an n-propyl group, an iso-propyl group, an n-butyl group, a sec-butyl group, an iso-butyl group, and a tert-butyl group.

For example, $R_4$ may be a fluorine-substituted methyl group or —N($R_5$)($R_6$), wherein $R_5$ and $R_6$ may each independently be hydrogen, a methyl group, an ethyl group, an n-propyl group, an iso-propyl group, an n-butyl group, a sec-butyl group, an iso-butyl group, or a tert-butyl group.

For example, $R_4$ may be —$CF_3$ or —N($CH_3$)$_2$.

In one or more embodiments, the repeating unit represented by Formula 1 may include at least repeating unit represented by Formula 1-1 to Formula 1-4.

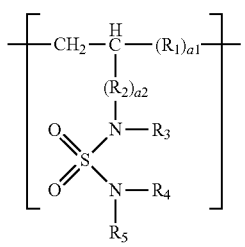

Formula 1-1

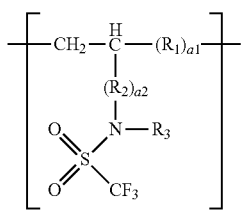

Formula 1-2

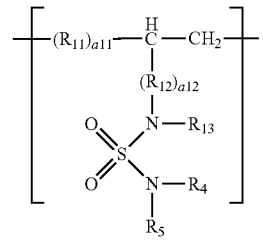

Formula 1-3

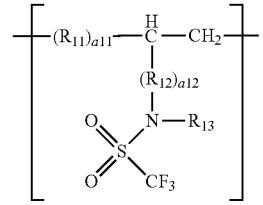

Formula 1-4

In Formula 1-1 to Formula 1-4, $R_1$, $R_2$, $R_3$, $R_{13}$, $R_4$, $R_5$, a1, and a2 may be defined the same as described above, and $R_{11}$, $R_{12}$, a11, a12, and $R_{13}$ may be defined the same as described for $R_1$, $R_2$, a1, a2, and $R_3$, respectively.

In one or more embodiments, the polymer compound may include a repeating unit represented by at least one Formula 1-1 to Formula 1-4.

In one or more embodiments, the polymer compound may include:

(i) the repeating unit represented by Formula 1-1 and the repeating unit represented by Formula 1-2, or (ii) the repeating unit represented by Formula 1-1 and the repeating unit represented by Formula 1-3, or (iii) the repeating unit represented by Formula 1-1 and the repeating unit represented by Formula 1-4, or (iv) the repeating unit represented by Formula 1-2 and the repeating unit represented by Formula 1-3, or (v) the repeating unit represented by Formula 1-2 and the repeating unit represented by Formula 1-4, or (vi) the repeating unit represented by Formula 1-3 and the repeating unit represented by Formula 1-4.

For example, the polymer compound may include the repeating unit represented by Formula 1-1, or the repeating unit represented by Formula 1-2.

For example, the polymer compound may include the repeating unit represented by Formula 1-3, or the repeating unit represented by Formula 1-4.

In one or more embodiments, in Formula 1-1 to Formula 1-4, $R_1$ and $R_{11}$ may each independently be a substituted or unsubstituted $C_1$-$C_{30}$ alkylene group. For example, in Formula 1-1 to Formula 1-4, $R_1$ and $R_{11}$ may each independently be a methylene group, an ethylene group, a propylene group, a butylene group, a pentylene group, or a hexylene group. For example, in Formula 1-1 to Formula 1-4, $R_1$ and $R_{11}$ may be a hexylene group.

In one or more embodiments, the polymer compound may include a repeating unit represented by at least one of Formula 2-1 or Formula 2-2.

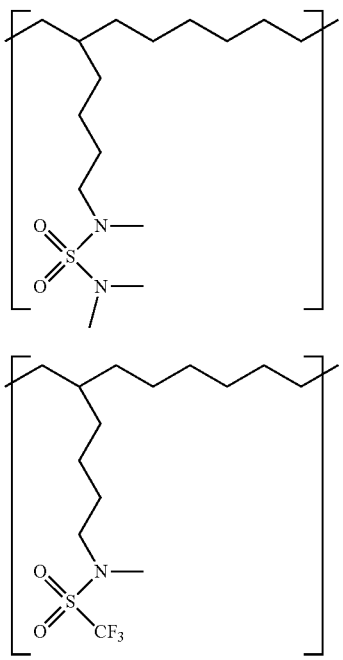

Formula 2-1

Formula 2-2

According to another aspect of the disclosure, a solid electrolyte film includes the polymer compound according to any of the above-described embodiments.

The polymer compound according to any of the embodiments, including a repeating unit represented by Formula 1, may have improved resistance to heat and chemicals by inclusion of a saturated hydrocarbon backbone. The polymer compound may also provide improved ionic conductivity due to the inclusion of a polar functional group such as a sulfone group linked to the hydrocarbon backbone. Accordingly, the solid electrolyte film including the polymer compound having such a novel structure may have improved ionic conductivity and improved stability with respect to a $Li_2O_2$ oxidation/reduction reaction.

As used herein, the term "polymer" refers to a compound formed by the polymerization of at least two or more repeating groups represented by Formula 1, and includes, for example, a dimer or an oligomer. Each repeating group in the polymer may be the same or different from each other. For example, the polymer compound may have an average molecular weight of about 100 Daltons to about 200,000 Daltons, about 500 Daltons to about 100,000 Daltons, or about 1,000 Daltons to about 75,000 Daltons. However, the average molecular weight of the polymer compound is not limited thereto, and may be appropriately varied.

In one or more embodiments, the polymer compound may be a solid at a temperature of about 50° C. or less. For example, the polymer compound may be a solid at a temperature of about 45° C. or less, and in some embodiments, at a temperature of about 40° C. or less, and in other some embodiments, at a temperature of about 35° C. or less, and in other some embodiments, at a temperature of about 30° C. or less, and in still other embodiments, about 25° C. or less. That is, the polymer compound may be a solid polymer compound which is a solid at room temperature.

Since the polymer compound is a solid above and at room temperature, a lithium-air battery including the polymer compound may have a simple structure without problems such as electrolyte leakage, and thus may have improved stability.

In one or more embodiments, the solid electrolyte film may have an ionic conductivity of about $4 \times 10^{-6}$ S/cm or greater at 60° C. When the solid electrolyte film has an ionic conductivity of $4 \times 10^{-6}$ S/cm or greater at 60° C., the solid electrolyte film may allow the movement of lithium ions in a lithium-air battery. For example, the solid electrolyte film may have an ionic conductivity at 60° C. of about $5 \times 10^{-6}$ S/cm or greater, and in some embodiments, about $6 \times 10^{-6}$ S/cm or greater, and in some embodiments, about $7 \times 10^{-6}$ S/cm or greater, and in some other embodiments, about $8 \times 10^{-6}$ S/cm or greater, and in some other embodiments, about $9 \times 10^{-6}$ S/cm or greater, and in some other embodiments, about $1 \times 10^{-5}$ S/cm or greater, and in some other embodiments, about $5 \times 10^{-5}$ S/cm or greater, and in some other embodiments, about $1 \times 10^{-4}$ S/cm or greater, and in still other embodiments, about $5 \times 10^{-4}$ S/cm or greater.

In one or more embodiments, when the solid electrolyte film has a thickness of about 2 micrometers (μm), the solid electrolyte film may have an area specific resistance of about 50 ohms per square centimeter (ohm·cm$^2$).

In one or more embodiments, the solid electrolyte film may have an electrochemical window of about 2 volts (V) to about 4.5 V. Accordingly, the solid electrolyte film may be stable at a charge/discharge voltage of a lithium battery.

In one or more embodiments, the solid electrolyte film may further include a lithium salt in addition to the polymer compound. The lithium salt may include at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y may each be independently a natural number from 1 to 30), LiF, LiBr, LiCl, LiI, $LiB(C_2O_4)_2$ (lithium bis(oxalato) borate; LiBOB), LiTFSI (lithium bis(trifluoromethanesulfonyl)Imide), or $LiNO_3$. However, embodiments are not limited thereto. Any lithium salt suitable for use in a lithium battery may be used.

An amount of the lithium salt may be about 0.001 weight percent (wt %) to about 30 wt %, or about 0.01 wt % to about 25 wt %, or about 0.1 wt % to about 25 wt %, or about 1 wt % to about 20 wt %, based on a total weight of the polymer compound. However, embodiments are not limited to this range. The amount of the lithium salt may be any range which allows effective lithium ion transfer during charge and discharge processes.

As used herein, a $C_1$-$C_{10}$ alkyl group refers to a linear or branched monovalent aliphatic hydrocarbon group having 1 to 10 carbon atoms. Non-limiting examples of the $C_1$-$C_{10}$ alkyl group include a methyl group, an ethyl group, a propyl group, an isobutyl group, a sec-butyl group, a tert-butyl group, a pentyl group, an iso-amyl group, and a hexyl group. As used herein, a $C_1$-$C_{20}$ alkylene group may refer to a divalent group having the same structure as the $C_1$-$C_{20}$ alkyl group.

As used herein, a $C_2$-$C_{10}$ alkenyl group refers to a linear or branched monovalent hydrocarbon group including at least one carbon-carbon double bond in the middle or at a terminal of the $C_2$-$C_{10}$ alkyl group. Non-limiting examples of the $C_2$-$C_{10}$ alkenyl group are an ethenyl group, a propenyl group, and a butenyl group. As used herein, a $C_2$-$C_{10}$ alkenylene group may refer to a divalent group having the same structure as the $C_2$-$C_{10}$ alkenyl group.

As used herein, a $C_2$-$C_{10}$ alkynyl group refers to a straight or branched chain hydrocarbon group including at least one carbon-carbon triple bond in the middle or at a terminal of the $C_2$-$C_{10}$ alkyl group. Non-limiting examples of the $C_2$-$C_{10}$ alkynyl group are an ethynyl group and a propynyl group. As used herein, a $C_2$-$C_{10}$ alkynylene group may refer to a divalent group having the same structure as the $C_2$-$C_{10}$ alkynyl group.

As used herein, a $C_1$-$C_{10}$ alkoxy group refers to a monovalent group represented by —$OR_{101}$ (wherein $R_{101}$ is a $C_1$-$C_{20}$ alkyl group, as described above). Non-limiting examples of the $C_1$-$C_{10}$ alkoxy group are a methoxy group, an ethoxy group, an iso-propyloxy group, sec-butyloxy group, pentyloxy groups, iso-amyloxy group, and hexyloxy group.

As used herein, a $C_3$-$C_{10}$ cycloalkyl group refers to a monovalent, monocyclic saturated hydrocarbon having 3 to 10 carbon atoms. Non-limiting examples of the $C_3$-$C_{10}$ cycloalkyl group are a cyclopropyl group, a cyclobutyl group, a cyclopentyl group, a cyclohexyl group, and a cycloheptyl group. As used herein, a $C_3$-$C_{10}$ cycloalkylene group may refer to a divalent monocyclic group having the same structure as the $C_3$-$C_{10}$ cycloalkyl group.

As used herein, a $C_1$-$C_{10}$ heterocycloalkyl group may refer to a monovalent saturated monocyclic group having at least one heteroatom selected from N, O, Si, P, and S as a ring-forming atom. Non-limiting examples of the $C_1$-$C_{10}$ heterocycloalkyl group are a 1,2,3,4-oxatriazolidinyl group, a tetrahydrofuranyl group, and a tetrahydrothiophenyl group. As used herein, a $C_1$-$C_{10}$ heterocycloalkylene group may refer to a divalent group having the same structure as the $C_1$-$C_{10}$ heterocycloalkyl group.

As used herein, a $C_3$-$C_{10}$ cycloalkenyl group refers to a non-aromatic, monovalent monocyclic group having 3 to 10 carbon atoms and at least one double bond in the ring structure. Non-limiting examples of the $C_3$-$C_{10}$ cycloalkenyl group are a cyclopentenyl group, a cyclohexenyl group, and a cycloheptenyl group. As used herein, a $C_3$-$C_{10}$ cycloalkenylene group may refer to a divalent group having the same structure as the $C_3$-$C_{10}$ cycloalkenyl group.

As used herein, a $C_1$-$C_{10}$ heterocycloalkenyl group refers to a monovalent monocyclic group that has at least one double bond in its ring and at least one heteroatom selected from N, O, Si, P, and S as a ring-forming atom. Non-limiting examples of the $C_1$-$C_{10}$ heterocycloalkenyl group are a 4,5-dihydro-1,2,3,4-oxatriazole group, a 2,3-dihydrofuranyl group, and a 2,3-dihydrothiophenyl group. As used herein, a $C_1$-$C_{10}$ heterocycloalkenylene group may refer to a divalent group having the same structure as the $C_1$-$C_{10}$ heterocycloalkenyl group.

As used herein, a $C_6$-$C_{10}$ aryl group refers to a monovalent, aromatic carbocyclic group having 6 to 10 carbon atoms. A $C_6$-$C_{10}$ arylene group refers to a divalent aromatic carbocyclic group having 6 to 10 carbon atoms. Non-limiting examples of the $C_6$-$C_{10}$ aryl group are a phenyl group, a naphthyl group, an anthracenyl group, a phenanthrenyl group, a pyrenyl group, and a chrysenyl group. When the $C_6$-$C_{10}$ aryl group and the $C_6$-$C_{10}$ arylene group include at least two rings, the rings may be fused to each other.

As used herein, a $C_1$-$C_{10}$ heteroaryl group refers to a monovalent, aromatic heterocyclic group including 1 to 10 carbon atoms and at least one heteroatom selected from N, O, Si, P, and S as a ring-forming atom. A $C_1$-$C_{10}$ heteroarylene group may refer to a divalent, aromatic heterocyclic group having 1 to 10 carbon atoms and at least one heteroatom selected from N, O, Si, P, and S as a ring-forming atom. Non-limiting examples of the $C_1$-$C_{10}$ heteroaryl group are a pyridinyl group, a pyrimidinyl group, a pyrazinyl group, a pyridazinyl group, a triazinyl group, a quinolinyl group, and an isoquinolinyl group. When the $C_1$-$C_{60}$ heteroaryl group includes at least two rings, the rings may be condensed to each other. When the $C_1$-$C_{10}$ heteroaryl group and the $C_1$-$C_{10}$ heteroarylene group include at least two rings, the rings may be fused to each other.

As used herein, a $C_6$-$C_{10}$ aryloxy group refers to a group represented by —$OR_{102}$ (wherein $R_{102}$ is a $C_6$-$C_{10}$ aryl group as described above), and a $C_6$-$C_{10}$ arylthio group may refer to a group represented by —$SR_{103}$ (wherein $R_{103}$ is a $C_6$-$C_{10}$ aryl group as described above).

As used herein, a monovalent non-aromatic condensed polycyclic group refers to a monovalent group having at least two rings fused to each other, in which only carbon atoms (for example, 8 to 60 carbon atoms) are included as ring-forming atoms, and no aromaticity in its entire structure. A non-limiting example of the monovalent non-aromatic condensed polycyclic group is a fluorenyl group. As used herein, a divalent non-aromatic condensed polycyclic group refers to a divalent group having the same structure as the monovalent non-aromatic condensed polycyclic group.

As used herein, a monovalent non-aromatic condensed heteropolycyclic group refers to a monovalent group having at least two rings condensed to each other, and including carbon atoms (for example, 1 to 60 carbon atoms) and at least one heteroatom selected from N, O, Si, P, and S as ring-forming atoms, and the entire molecule has non-aromaticity. A non-limiting example of the monovalent non-aromatic condensed heteropolycyclic group is a carbazolyl group. As used herein, a divalent non-aromatic condensed heteropolycyclic group may refer to a divalent group having the same structure as the monovalent non-aromatic condensed heteropolycyclic group.

According to another aspect of the disclosure, a lithium-air battery includes: a positive electrode; a negative electrode; and a solid electrolyte film between the positive electrode and the negative electrode, the solid electrolyte film including the polymer compound according to any of the above-described embodiments. Due to the inclusion of the solid electrolyte film, the lithium-air battery may have improved thermal stability, improved chemical stability, reduced interfacial resistance between the positive electrode and the solid electrolyte film, and improved lithium-ion conductivity. The lithium-air battery may also have improved lifetime characteristics.

The above-described details of the polymer compound, according to any of the embodiments, and the solid electrolyte film according to any of the embodiments may apply to the polymer compound and the solid electrolyte film included in the lithium-air battery.

In one or more embodiments, the solid electrolyte film and the positive electrode may be in contact with each other. Due to the contact between the solid electrolyte film and the positive electrode, the interfacial resistance therebetween may be reduced. The positive electrode will be described later in detail.

In one or more embodiments, the lithium-air battery may further include an oxygen blocking film between the solid electrolyte film and the negative electrode. The negative electrode and the oxygen blocking film will be described later in detail.

In one or more embodiments, the solid electrolyte film and the oxygen blocking film may be in contact with each other.

In one or more embodiments, the negative battery of the lithium-air battery may include lithium metal, a lithium metal-based alloy, a material capable of incorporation/deincorporation of lithium ions, or a combination thereof. However, embodiments are not limited thereto. Any material suitable for the negative electrode, including lithium or a material capable of incorporation/deincorporation of lithium ions, may be used. The negative electrode, which determines capacity of the lithium-air battery, may be, for example, a lithium metal, a lithium metal-based alloy, or a combination thereof. The lithium metal-based alloy may be an alloy of lithium with, for example, aluminum, tin, magnesium, indium, calcium, titanium, or vanadium.

In one or more embodiments, the lithium-air battery may further include a separator. The separator is not specifically limited, and may be any material having a composition durable within an operating voltage range of the lithium-air battery. For example, the separator may be a polymeric non-woven fabric such as a polypropylene non-woven fabric or a polyphenylene sulfide non-woven fabric, or a porous film made of an olefin-based resin including, for example, polyethylene or polypropylene. A combination of at least two of these materials may be used as the separator.

In one or more embodiments, the lithium-air battery may further include an oxygen blocking film between the positive electrode and the negative electrode. For example, the oxygen blocking film may function as a protective layer for preventing direct reaction of lithium in the negative electrode with impurities from outside such as moisture and/or oxygen.

For example, the oxygen blocking film may include a lithium ion conductive glass, lithium ion conductive crystals (ceramic or glass-ceramic), or a combination thereof. However, embodiments are not limited thereto. Any solid electrolyte membrane having lithium ion conductivity and capable of protecting the positive electrode and/or the negative electrode may be used. For example, in view of chemical stability, the oxygen blocking film may include a lithium ion conducting oxide.

For example, the lithium ion conductive crystals may be $Li_{1+x+y}(Al, Ga)_x(Ti, Ge)_{2-x}Si_yP_{3-y}O_{12}$ (wherein $0 \leq x \leq 1$ and $0 \leq y \leq 1$, for example, $0 \leq x \leq 0.4$, and $0 < \leq 0.6$, or $0.1 \leq x \leq 0.3$ and $0.1 < y \leq 0.4$). The lithium ion conductive glass-ceramic may be, for example, lithium-aluminum-germanium-phosphate (LAGP), lithium-aluminum-titanium-phosphate (LATP), or lithium-aluminum-titanium-silicon-phosphate (LATSP), or a combination thereof.

The oxygen blocking film may further include, in addition to a glass-ceramic, an inorganic solid electrolyte material. The inorganic solid electrolyte material may be, for example, $Cu_3N$, $Li_3N$, LiPON, or a combination thereof.

The lithium-air battery may further include a gas diffusion layer on a surface of the positive electrode. The oxygen present in the air may be provided into the lithium-air battery by diffusion through the gas diffusion layer. The gas diffusion layer may have electronic conductivity. Due to its electronic conductivity, the gas diffusion layer may serve as a positive electrode current collector. The gas diffusion layer may include a porous carbonaceous material, a porous metal, or a combination thereof. However, embodiments are not limited thereto. Any material suitable for use as the conductive gas diffusion layer may be used. For example, the porous carbonaceous material may be a carbon fiber non-woven fabric. The conductive carbonaceous gas diffusion layer may have a density which is less than the density of a metal, and thus may further improve the total energy density of the lithium-air battery.

For example, the lithium-air battery may be manufactured in the following manner.

First, a positive electrode is prepared. For example, the positive electrode may be prepared as follows.

Positive electrode conductive particles having both lithium-ionic conductivity and electronic conductivity are mixed with a binder and a solvent to prepare a positive electrode slurry, then the positive electrode slurry may be coated on a surface of a current collector and sintered to thereby form the positive electrode. The current collector may be a gas diffusion layer.

Optionally, the positive electrode slurry may further include a binder. The binder may include a thermoplastic resin or a thermocurable resin. For example, the binder may be polyethylene, polypropylene, polytetrafluoroethylene (PTFE), polyvinylidene fluoride (PVdF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, or a combination thereof. However, embodiments are not limited thereto. Any suitable binder may be used.

A porous structure having a matrix or mesh form may be used as the current collector to facilitate diffusion of oxygen. A porous metal plate including, for example, stainless steel, nickel, an aluminum, or a combination thereof, may also be used as the current collector. Materials for the current collector are not particularly limited, and any appropriate material for use as a current collector may be used. The current collector may be coated with an anti-oxidation metal or a metal alloy film to prevent oxidation.

Next, a negative electrode is prepared. For example, as described above, the negative electrode may be a lithium metal.

Next, an oxygen blocking film may be prepared. The oxygen blocking film may have a structure including a separator impregnated with a lithium ion conductive polymer electrolyte. In one or more embodiments, the oxygen blocking film may be prepared by injecting a liquid electrolyte including a lithium salt into a separator.

Next, after the negative electrode is mounted on an inner side of a case, the oxygen blocking film may be disposed on the negative electrode, the solid electrolyte film may be disposed on the oxygen blocking film, and then the positive electrode may be disposed on the solid electrolyte film. Subsequently, a porous current collector may be disposed on the positive electrode, and a pressing member which may transfer the air to the air electrode (e.g., positive electrode) may be disposed on the porous current collector and pressed against the same (e.g., by pushing) to fix the cell, thereby completing manufacturing of the lithium-air battery.

The case may be divided into an upper portion which contacts the negative electrode, and a lower portion which contacts the air electrode. An insulating resin or polymer may be disposed between the upper and lower portions of the case to electrically insulate the air electrode and the negative electrode from one another.

In one or more embodiments, the lithium-air battery may be a lithium primary battery or a lithium secondary battery. The lithium-air battery may have any of various shapes, and is not limited to a specific shape. For example, the lithium-air battery may have a shape like a coin, a button, a sheet, a stack, a cylinder, a plane, or a horn. The lithium-air battery may be as a battery for an electric vehicle.

FIG. 1 is a schematic view of a lithium-air battery 10 according to an embodiment. Referring to FIG. 1, the lithium-air battery 10 may include a positive electrode layer (or a positive electrode) 12, using oxygen as an active material, the positive electrode layer 12 being adjacent to a first current collector (not shown), a negative electrode 15 including lithium, the negative electrode 15 being adjacent to a second current collector 16, and an oxygen blocking film 14 between the positive electrode layer 12 and the negative electrode 15. A solid electrolyte film 13 may be between the positive electrode layer 12 and the oxygen blocking film 14. The positive electrode layer 12 may contact the first current collector. The first current collector may be porous and serve as a gas diffusion layer which allows diffusion of the air. A pressing member 18 which may transfer the air to the air electrode (e.g., positive electrode layer 12) may be on the first current collector. A case 17 made of an insulating resin may be located between the positive electrode layer 12 and the negative electrode 15 to electrically insulate the positive electrode layer 12 and the negative electrode 15 from one another. The air may be supplied to the lithium-air battery 10 through an air inlet 19a and discharged through an air outlet 19b. The lithium-air battery 10 may be accommodated in a stainless steel container.

The term "air" as it pertains to the lithium-air battery described herein is not limited to atmospheric air, and may refer to, for example, a combination of gases including oxygen, or pure oxygen gas. This broad definition of the term "air" also applies to other terms, including "air battery" and "air electrode."

One or more embodiments of the disclosure will now be described in detail with reference to the following examples. However, these examples are only for illustrative purposes and are not intended to limit the scope of the one or more embodiments of the disclosure.

EXAMPLES (Preparation of Polymer Compound)

Synthesis Example 1: Preparation of Intermediate

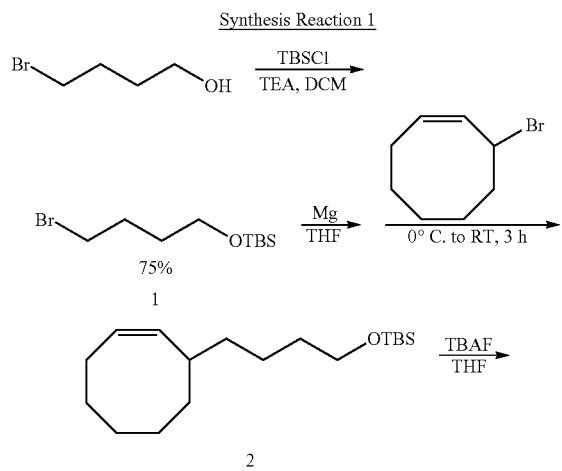

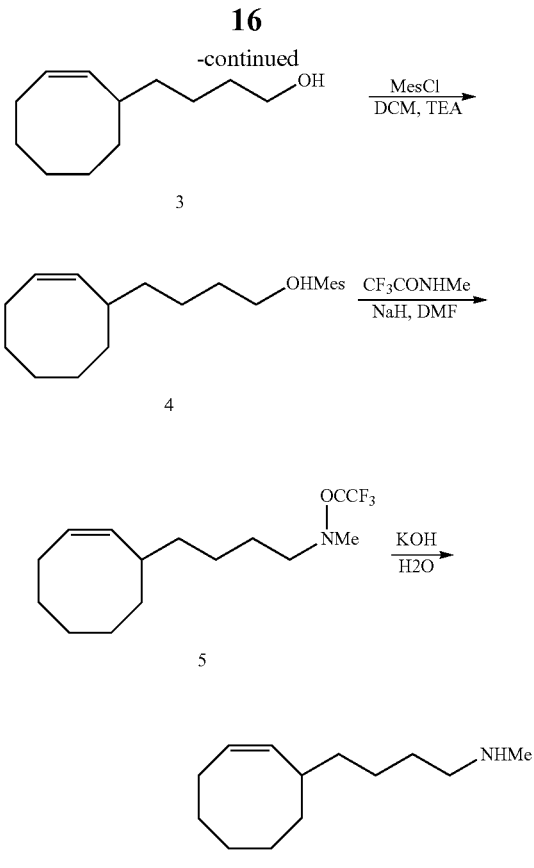

After 4-bromobutanol (11.5 g, 1 equiv.) was added to 60 milliliters (mL) of dichloromethane ($CH_2Cl_2$), TBSCl (tert-butyldimethylsilyl chloride, 11.8 g, 1.3 equiv.), DMAP (4-dimethylaminopyridine, 0.05 mole equiv.), and $Et_3N$ (triethylamine, TEA, 1.3 equiv.) were added thereto to obtain a compound denoted by No. 1 (hereinafter, referred to as "Compound 1") in the above Synthesis reaction 1. A catalytic amount of iodine was added to magnesium turnings (1.1 g, 1.2 mole equiv.), and then Compound 1 (10.2 g, 1.0 equiv.) was slowly added thereto at about 50° C. The resultant was then added to a tetrahydrofuran (THF) solution including 3-bromo-1-cyclooctene (7.18 g, 1.05 equiv.) and CuI (73 mg, 0.01 equiv.) under nitrogen atmosphere to obtain Compound 2. Then, 1.0 M TBAF (tetrabutylammonium fluoride, 1.5 equiv.) was added to a THF solution including Compound 2 (1 equiv.) to obtain Compound 3. Compound 3 (5.7 g, 1 equiv.) and triethylamine (4.7 g, 1.5 equiv.) were then mixed together and a $CH_2Cl_2$ solvent was added thereto, the temperature was slowly cooled down to 0° C., and methanesulfonyl chloride (5.0 g, 1.3 equiv.) was slowly added thereto to obtain Compound 4. After N-methyl-trifluoroacetamide (3.4 g, 1 equiv.) was dissolved in dimethylformamide (DMF) and the temperature was cooled down under nitrogen atmosphere to 0° C., sodium hydride (0.68 g, 1.1 equiv.) was slowly added thereto over a period of 1 hour, and then a DMF solution including Compound 4 (6.0 g, 1 equiv.) was slowly added thereto to obtain Compound 5 (3.7 g). Next, Compound 5 was added to a mixed solution of KOH and $H_2O$, and the temperature was increased to about 70° C. to thereby obtain Compound 6. The above-described synthesis is illustrated in Synthesis Reaction 1 above.

Synthesis Example 2: Preparation of Poly(Sulfamide)

Synthesis Reaction 2

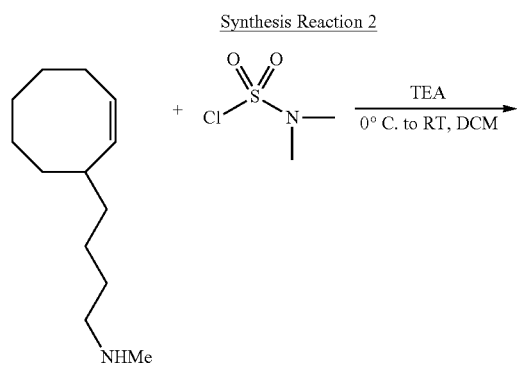

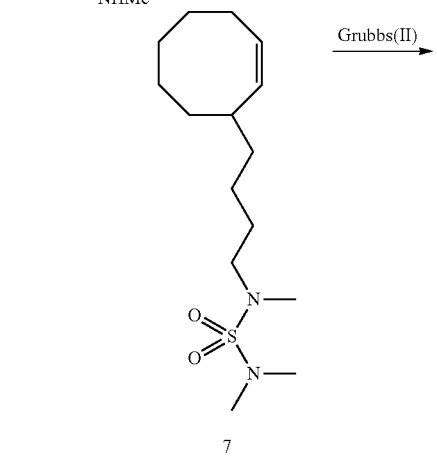

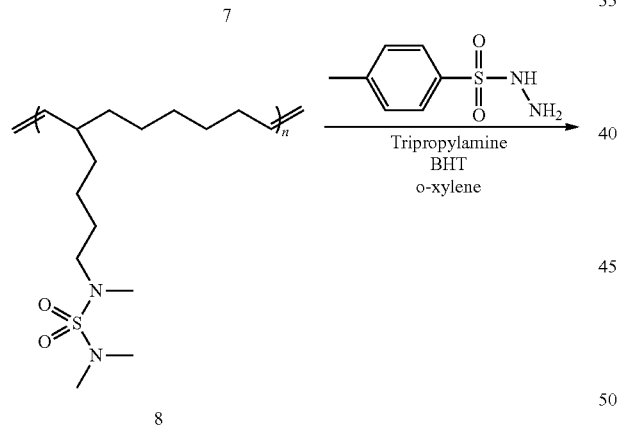

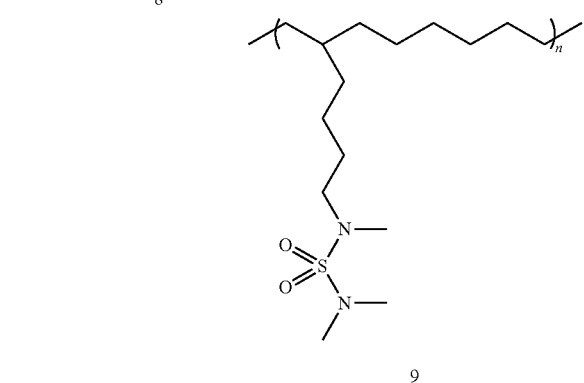

After a CH₂Cl₂ solvent was added to Compound 6 (0.7 g, 1 equiv.) and triethylamine (0.9 g, 2.5 equiv.), and the temperature was cooled down to 0° C., dimethylsulfamoyl chloride (0.77 g, 1.5 equiv.) was slowly added thereto to obtain Compound 7. Compound 7 (1.0 g, 1 equiv.) was added to a CH₂Cl₂ solvent, and then a solution of a Grubbs (II) catalyst (0.5 mol %) dissolved in CH₂Cl₂ was rapidly added thereto to obtain Compound 8. Compound 8 (1.0 g, 1.0 double bond equiv.), p-toluenesulfonyl hydrazide (5.0 equiv.), tripropylamine (5.0 equiv.), and a catalytic amount of butylated hydroxytoluene (BHT) (ca. 10 mg) were dissolved in o-xylene and refluxed to thereby obtain Compound 9. The above-described synthesis is illustrated in Synthesis Reaction 2, above.

Synthesis Example 3: Preparation of Poly CF₃-Sulfonamide

Synthesis Reaction 3

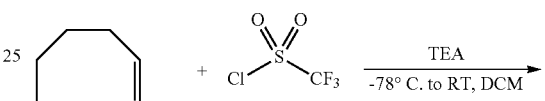

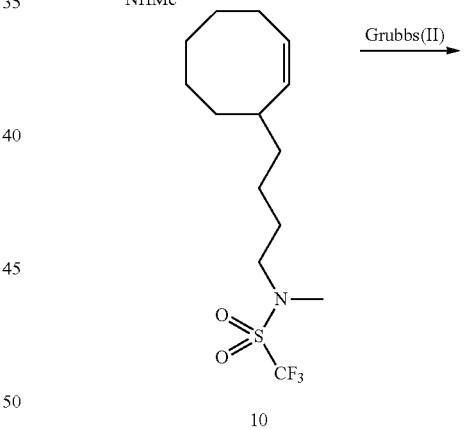

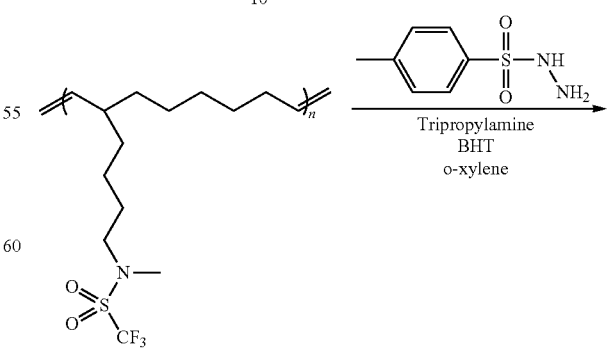

-continued

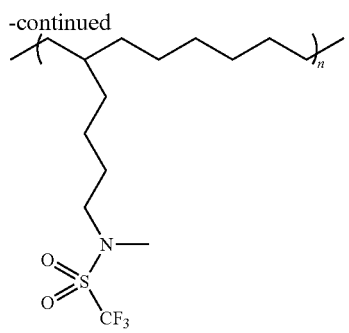

12

After a $CH_2Cl_2$ solvent was added to Compound 6 (1 g, 1 equiv.) and triethylamine (1.03 g, 2.5 equiv.) and the temperature was cooled down to −78° C., trifluoromethane-sulfonyl chloride (1.29 g, 1.5 equiv.) was slowly added thereto and stirred for about 12 hours while increasing the temperature to room temperature to thereby obtain Compound 10. Compound 10 (1.0 g, 1 equiv.) was added to a $CH_2Cl_2$ solvent, and then a solution of a Grubbs(II) catalyst (0.5 mol %) dissolved in $CH_2Cl_2$ was rapidly added thereto to obtain Compound 11. Compound 11 (1.0 g, double bond 1 equiv.), p-toluenesulfonyl hydrazide (5.0 equiv.), tripropylamine (5.0 equiv.), a catalytic amount of BHT (ca. 10 mg) were dissolved in o-xylene and refluxed to thereby obtain Compound 12. The above-described synthesis is illustrated in Synthesis Reaction 3, above.

Preparation Example 1

LiTFSI (1 equiv.) and Compound 9 (8 equiv. on a monomer basis) obtained in Synthesis Example 2 were dissolved in THF. The obtained solution was poured into a Teflon dish to form a solid electrolyte film.

Preparation Example 2

A solid electrolyte film was formed in the same manner as in Preparation Example 1, except that Compound 12 (8 equiv. on a monomer basis) obtained in Synthesis Example 3 was used instead of Compound 9 obtained in Synthesis Example 2.

Preparation Example 3

A solid electrolyte film was formed in the same manner as in Preparation Example 1, except that polyethylene oxide (PEO) (18 equiv. on an oxygen basis) was used instead of Compound 9 obtained in Synthesis Example 2.
(Ionic Conductivity Measurement)

Example 1

A gold (Au) electrolyte having a thickness of about 50 μm was disposed on the electrolyte film obtained in Preparation Example 1 to thereby manufacture an electron blocking cell.

Example 2

An electron blocking cell was manufactured in the same manner as in Example 1, except that the electrolyte film obtained in Preparation Example 2 was used instead of the electrolyte film obtained in Preparation Example 1.

Comparative Example 1

An electron blocking cell was manufactured in the same manner as in Example 1, except that the electrolyte film obtained in Preparation Example 3 was used instead of the electrolyte film obtained in Preparation Example 1.

Figure 2A:
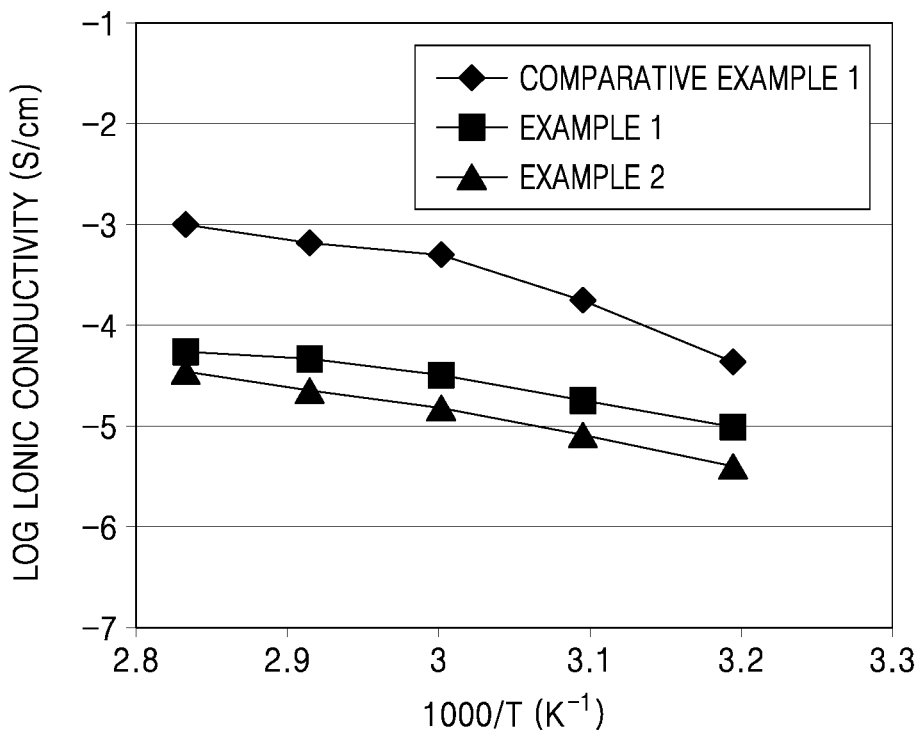
FIG. 2A is a graph of log ionic conductivity (Siemens per centimeter, S/cm) versus reciprocal temperature (1000/T, in Kelvin, K) of the cells manufactured in accordance with Examples 1 and 2 and Comparative Example 1.

Ionic conductivities of the electron blocking cells of Example 1, Example 2, and Comparative Example 1 were measured. As a result, as illustrated in FIG. 2A, the electron blocking cells of Examples 1 and 2 including the solid electrolyte films of Preparation Examples 1 and 2, respectively, including the polymer compounds according to embodiments, were found to have a smaller ionic conductivity than the electron blocking cell of Comparative Example 1, and to have an improved ionic conductivity of about $10^{-5}$ S/cm or greater at 60° C.
(Electrochemical Stability Evaluation)

Example 3

A lithium metal was used as a negative electrode, and a polypropylene separator impregnated with an electrolyte including 1M LiTFSI in propylene carbonate was interposed as a negative electrode electrolyte between the negative electrode and a 250-um LICGC™ (LATP) plate. After the solid electrolyte film of Preparation Example 2 was disposed on a surface of the LATP opposite to the polypropylene separator, a gold (Au) electrode having a thickness of about 50 μm was disposed on the solid electrolyte film, thereby manufacturing a cell for use in electrochemical stability evaluation, the cell having a stacked structure of Li/negative electrode electrolyte/LATP/electrolyte film for evaluation/ Au.

Example 4

A cell for use in electrochemical stability evaluation was manufactured in the same manner as in Example 3, except that the electrolyte film obtained in Preparation Example 2 was used instead of the electrolyte film obtained in Preparation Example 1.

Comparative Example 2

A cell for use in electrochemical stability evaluation was manufactured in the same manner as in Example 3, except that the electrolyte film obtained in Preparation Example 3 was used instead of the electrolyte film obtained in Preparation Example 1.

Current in each of the cells manufactured in Examples 3 and 4 and Comparative Example 2 for electrochemical stability evaluation was measured with a varying voltage in a range of 2 V to 5 V to evaluate electrochemical stability.

Figure 2B:
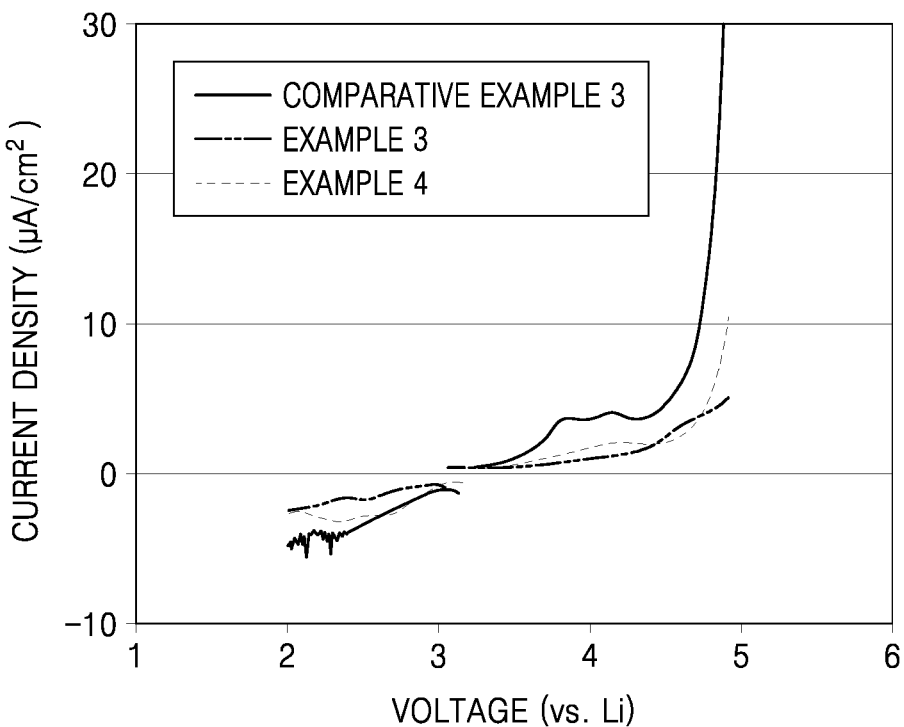
FIG. 2B is a graph of current density (microamperes per square centimeter, $\mu A/cm^2$), illustrating results of electrochemical performance evaluation of the cells manufactured in accordance with Example 3, Example 5, and Comparative Example 3.

As a result, as illustrated in FIG. 2B, in the cells of Examples 3 and 4 including the solid electrolyte films including the polymer compounds of Synthesis Examples 2 and 3, respectively, a sharp change in current density was not observed in the voltage range of 2 V to 4.5 V, indicating that the cells of Examples 3 and 4 are stable in the voltage range. On the contrary, in the cell of Comparative Example 2 including the solid electrolyte film including PEO, a sharp change in current density was observed near 4.5 V, indicating that the solid electrolyte film including PEO is decomposed due to being involved in oxidation/reduction reaction.

(Evaluation of Stability with Respect to $Li_2O_2$)

Example 5

A composite positive electrode was manufactured using the solid electrolyte film of Preparation Example 1 as a positive electrode electrolyte, and including 1 mg of $^{13}C$ carbon nanotubes (CNT) as a catalyst deposited onto the positive electrode electrolyte by floating catalytic chemical vapor deposition (FCCVD). A lithium metal was used as a negative electrode, and a polypropylene separator impregnated with an electrolyte including 1 molar (M) LiTFSI in propylene carbonate was interposed as a negative electrode electrolyte between the negative electrode and a 250-um LICGC™ (LATP) plate. Then, the composite positive electrode was disposed on a surface of the LATP opposite to the polypropylene separator, thereby manufacturing a lithium-air battery for evaluation of stability against $Li_2O_2$.

Comparative Example 3

A lithium-air battery for stability evaluation was manufactured in the same manner as in Example 5, except that the solid electrolyte film obtained in Preparation Example 3 was used instead of the solid electrolyte film obtained in Preparation Example 1.

Then, after each of the cells for evaluation manufactured in Example 5 and Comparative Example 3 was discharged at about 60° C. under an oxygen atmosphere to about 0.1 mA/cm², gases generated during charging were analyzed using differential electrochemical mass spectroscopy to measure decomposed amounts of the CNT electrode and the solid electrolyte.

Figure 3A:
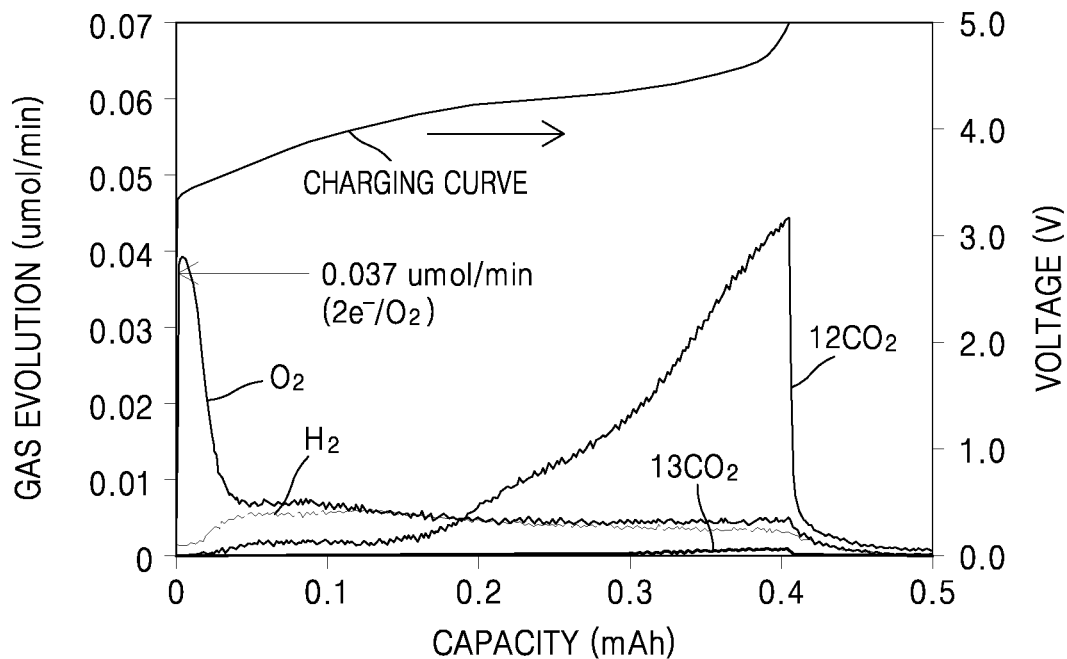
FIGS. 3A and 3B are graphs of gas evolution (micromoles per min, $\mu mol/min$) versus capacity (milliampere hours, mAh), illustrating the evolution of gas, including $CO_2$, during charging of the lithium-air batteries of Comparative Example 3 and Example 5.
Figure 3B:
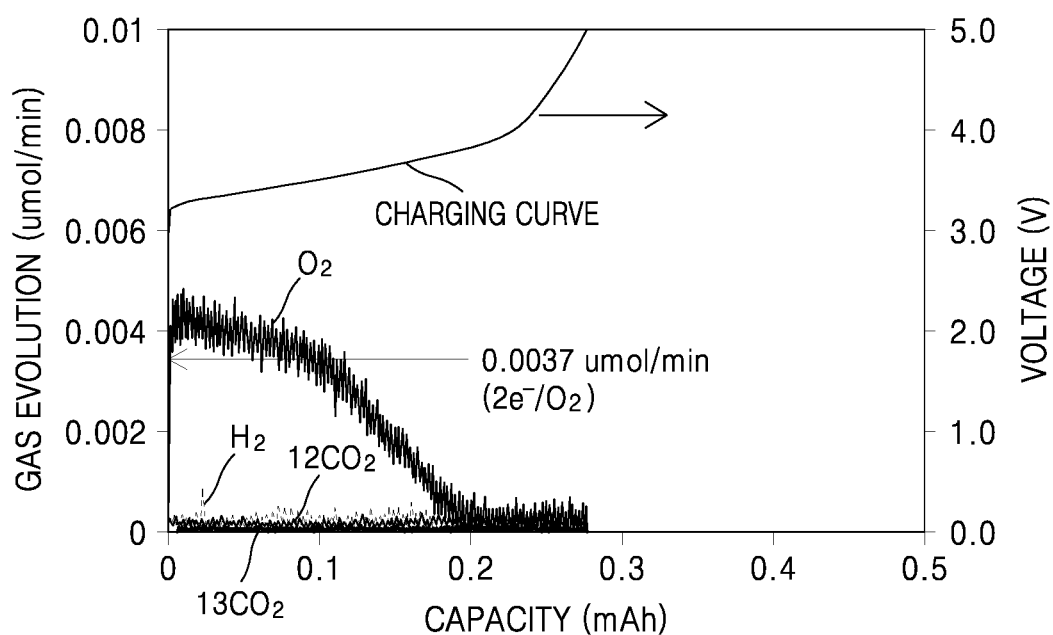

The results are shown in Table 1 and FIGS. 3A and 3B. Referring to FIG. 3A, the lithium-air battery of Comparative Example 3 was found to generate a large amount of $^{12}CO_2$, supporting generation of $Li_2O_2$ as a discharge product and occurrence of a side reaction of the PEO during the discharging. On the contrary, referring to FIG. 3B, the lithium-air battery of Example 5 was found to generate a reduced amount of $^{12}CO_2$, only one-thirtieth (1/30) of that of the lithium air-battery of Comparative Example 3, supporting improved stability during the discharging.

Compound 9 obtained in Synthesis Example 2 was spin-coated to form an electrolyte film having a thickness of about 2 μm to about 3 μm, and $Li_4Ti_5O_{12}$ powder having electronic conductivity and ionic conductivity was applied thereonto, thereby manufacturing a lithium-air battery.

Example 7

A lithium-air battery was manufactured in the same manner as in Example 6, except that Compound 12 obtained in Synthesis Example 3 was used instead of Compound 9 obtained in Synthesis Example 2.

Comparative Example 4

A lithium-air battery was manufactured in the same manner as in Example 6, except that PEO was used instead of Compound 9 obtained in Synthesis Example 2.

Each of the lithium-air batteries manufactured in Example 6, Example 7 and Comparative Example 4 was discharged and charged (CC/CV mode, 2 μA/cm² cut) at about 60° C. under oxygen atmosphere at a current density of about 10 μA/cm² in a voltage range of about 2 V to 4.2 V. Charge and discharge profiles of the lithium-air batteries after a single charge-discharge cycle are represented in FIG. 4.

Figure 4:
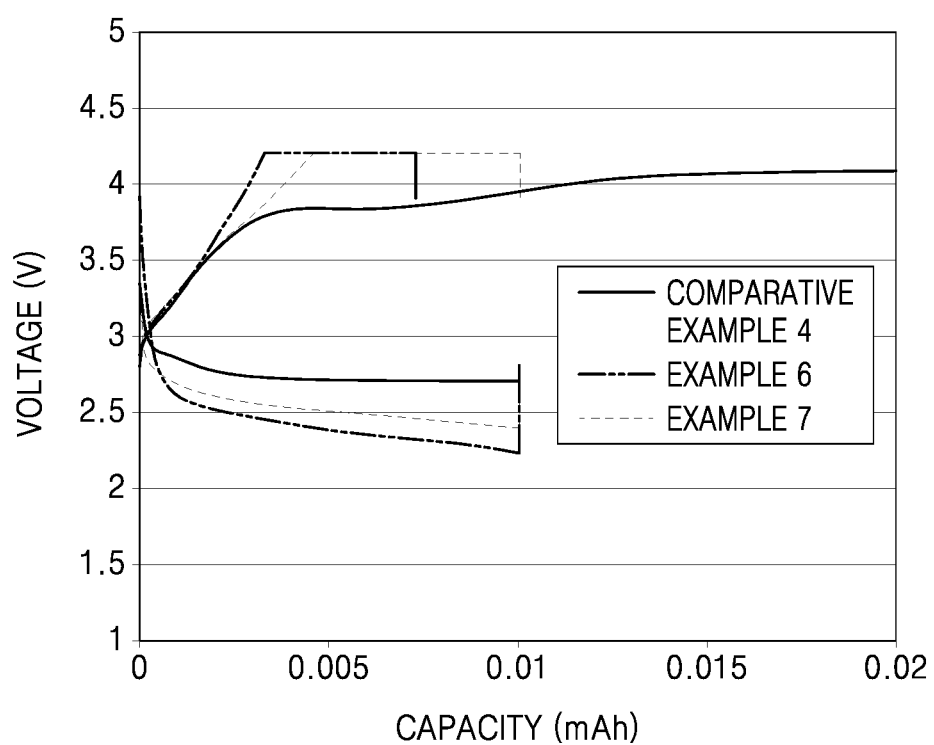
FIG. 4 is a graph of voltage (volts, V) versus capacity (mAh), illustrating initial charge and discharge profiles of the lithium-air batteries of Example 6, Example 7, and Comparative Example 4.

As a result, as illustrated in FIG. 4, the lithium-air batteries of Examples 6 and 7 were found to stably operate after the charge-discharge cycle in which charge was performed at a constant current up to 4.2V. On the contrary, it was not possible to charge the lithium-air battery of Comparative Example 4 at a constant current with a voltage greater than 4V.

As described above, according to the one or more embodiments, a solid electrolyte film including a polymer compound having a novel structure according to any of the embodiments may reduce interfacial resistance between a positive electrode and an oxygen blocking film in a lithium-air battery by being interposed between the positive electrode and the oxygen blocking film.

It should be understood that embodiments described herein should be considered in a descriptive sense only and

TABLE 1

|  | Comparative Example 3 | | | | Example 5 | | | |
| --- | --- | --- | --- | --- | --- | --- | --- | --- |
| Gas evolution (μmol) | $H_2$ 0.87109 | $O_2$ 1.38589 | $^{12}CO_2$ 2.47191 | $^{13}CO_2$ 0.04571 | $H_2$ 0.14730 | $O_2$ 2.90498 | $^{12}CO_2$ 0.08920 | $^{13}CO_2$ 0.02484 |
| % (Gas evolution rate) | 18.24 | 29.03 | 51.77 | 0.96 | 4.65 | 91.75 | 2.82 | 0.78 |
| Total gas evolution | | 4.775 μmol* | | | | 3.1663 μmol** | | |
| Theoretical oxygen consumption | | 7.557 μmol | | | | 5.16882 μmol | | |
| % (with respect to oxygen consumption) | 11.53 | 18.34 | 32.71 | 0.60 | 2.85 | 56.20 | 1.73 | 0.48 |

*$2e^-/O_2$ when discharged to 0.405 mAh (on a $Li_2O_2$ generation basis)
**$2e^-/O_2$ when discharged to 0.277 mAh (on a $Li_2O_2$ generation basis)

(Manufacture of Lithium-Air Battery)

Example 6

A lithium metal was used as a negative electrode, and a polypropylene separator impregnated with an electrolyte including 1M LiTFSI in propylene carbonate was interposed as a negative electrode electrolyte between the negative electrode and a 250-um LICGC™ (LATP) plate. Then, not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A polymer compound comprising a repeating unit represented by Formula 1:

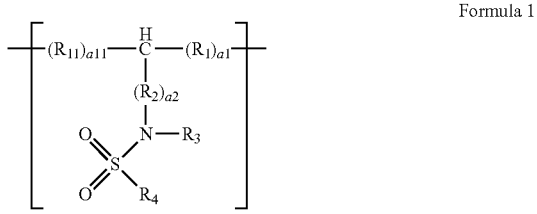

Formula 1 wherein, in Formula 1, $R_1$ and $R_{11}$ are each independently a single bond or a substituted or unsubstituted $C_1$-$C_{30}$ alkylene group, $R_2$ is a substituted or unsubstituted $C_1$-$C_{10}$ alkylene group, a substituted or unsubstituted $C_2$-$C_{10}$ alkenylene group, a substituted or unsubstituted $C_3$-$C_{10}$ cycloalkylene group, a substituted or unsubstituted $C_3$-$C_{10}$ cycloalkenylene group, a substituted or unsubstituted $C_6$-$C_{10}$ arylene group, or a substituted or unsubstituted divalent non-aromatic condensed polycyclic group, $R_3$ is hydrogen, a substituted or unsubstituted $C_1$-$C_{10}$ alkyl group, a substituted or unsubstituted $C_3$-$C_{10}$ cycloalkyl group, a substituted or unsubstituted $C_3$-$C_{10}$ cycloalkenyl group, a substituted or unsubstituted $C_6$-$C_{10}$ aryl group, or a substituted or unsubstituted monovalent non-aromatic condensed polycyclic group, $R_4$ is hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_3$-$C_{10}$ cycloalkyl group, a substituted or unsubstituted $C_3$-$C_{10}$ cycloalkenyl group, a substituted or unsubstituted $C_6$-$C_{10}$ aryl group, a substituted or unsubstituted monovalent non-aromatic condensed polycyclic group, or —N($R_5$)($R_6$), $R_5$ and $R_6$ are each independently hydrogen, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_1$-$C_{10}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{10}$ aryl group, a substituted or unsubstituted $C_6$-$C_{10}$ aryloxy group, a substituted or unsubstituted $C_6$-$C_{10}$ arylthio group, a substituted or unsubstituted $C_1$-$C_{10}$ heteroaryl group, a substituted or unsubstituted monovalent non-aromatic condensed polycyclic group, or a substituted or unsubstituted monovalent non-aromatic condensed heteropolycyclic group, a1 and a11 are each independently an integer of 1 to 30, wherein, when a1 is 2 or greater, each $R_1$ is independently the same or different as another $R_1$, and when a11 is 2 or greater, each $R_{11}$ is independently the same or different as another $R_{11}$, and a2 is an integer of 1 to 10, wherein, when a2 is 2 or greater, each $R_2$ is independently the same or different as another $R_2$.

2. The polymer compound of claim 1, wherein one of $(R_{11})_{a11}$ or $(R_1)_{a1}$ is a methylene group.

3. The polymer compound of claim 1, wherein $R_2$ is a substituted or unsubstituted $C_1$-$C_{10}$ alkylene group.

4. The polymer compound of claim 1, wherein $R_3$ is hydrogen or a substituted or unsubstituted $C_1$-$C_{10}$ alkyl group.

5. The polymer compound of claim 1, wherein $R_4$ is hydrogen, a substituted or unsubstituted $C_1$-$C_{10}$ alkyl group, or —N($R_5$)($R_6$), and $R_5$ and $R_6$ are each independently hydrogen or a substituted or unsubstituted $C_1$-$C_{10}$ alkyl group.

6. The polymer compound of claim 1, wherein $R_4$ is:

a methyl group, an ethyl group, an n-propyl group, an iso-propyl group, an n-butyl group, a sec-butyl group, an iso-butyl group, a tert-butyl group, a pentyl group, or a hexyl group;

a substituted methyl group, a substituted ethyl group, a substituted n-propyl group, a substituted iso-propyl group, a substituted n-butyl group, a substituted sec-butyl group, a substituted iso-butyl group, a substituted tert-butyl group, a substituted pentyl group, or a substituted hexyl group, each substituted with at least one of deuterium, —F, —Cl, —Br, —I, a methyl group, an ethyl group, an n-propyl group, an iso-propyl group, an n-butyl group, a sec-butyl group, an iso-butyl group, a tert-butyl group, a pentyl group, or a hexyl group; or —N($R_5$)($R_6$), and $R_5$ and $R_6$ are each independently a methyl group, an ethyl group, an n-propyl group, an iso-propyl group, an n-butyl group, a sec-butyl group, an iso-butyl group, a tert-butyl group, a pentyl group, or a hexyl group.

7. The polymer compound of claim 1, wherein $R_4$ is a fluorine-substituted methyl group or —N($R_5$)($R_6$), and $R_5$ and $R_6$ are each independently hydrogen, a methyl group, an ethyl group, an n-propyl group, an iso-propyl group, an n-butyl group, a sec-butyl group, an iso-butyl group, or a tert-butyl group.

8. The polymer compound of claim 1, wherein $R_4$ is —$CF_3$ or —N($CH_3$)$_2$.

9. The polymer compound of claim 1, wherein the repeating unit represented by Formula 1 comprises at least one repeating unit represented by Formula 1-1 to Formula 1-4:

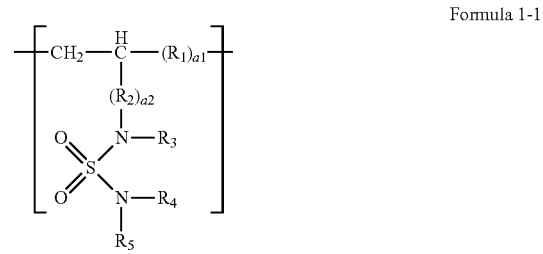

Formula 1-1

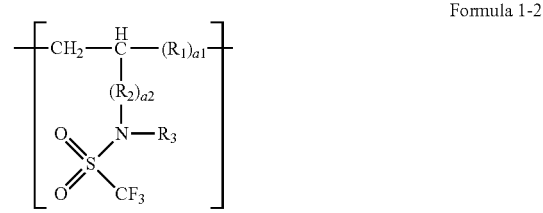

Formula 1-2

Formula 1-3

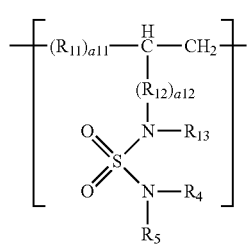

Formula 1-4

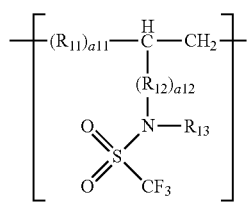

Formula 2-1

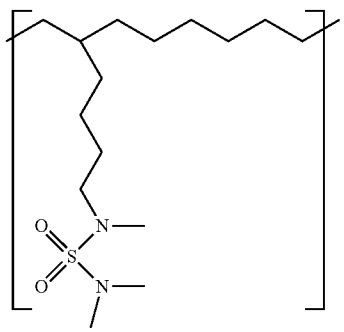

Formula 2-2

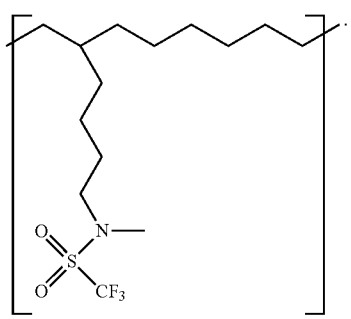

wherein, in Formula 1-1 to Formula 1-4, $R_1$, $R_2$, $R_3$, $R_{13}$, $R_4$, $R_5$, a1, and a2 are defined the same as in claim 1, and $R_{11}$, $R_{12}$, a11, a12, and $R_{13}$ are defined the same as $R_1$, $R_2$, a1, a2, and $R_3$ of claim 1, respectively.

10. The polymer compound of claim 9, wherein the polymer compound comprises:

(i) the repeating unit represented by Formula 1-1 and the repeating unit represented by Formula 1-2, (ii) the repeating unit represented by Formula 1-1 and the repeating unit represented by Formula 1-3, (iii) the repeating unit represented by Formula 1-1 and the repeating unit represented by Formula 1-4, (iv) the repeating unit represented by Formula 1-2 and the repeating unit represented by Formula 1-3, (v) the repeating unit represented by Formula 1-2 and the repeating unit represented by Formula 1-4, or (vi) the repeating unit represented by Formula 1-3 and the repeating unit represented by Formula 1-4.

11. The polymer compound of claim 9, wherein $R_1$ and $R_{11}$ are each independently a substituted or unsubstituted $C_1$-$C_{30}$ alkylene group.

12. The polymer compound of claim 9, wherein $R_1$ and $R_{11}$ are each a hexylene group.

13. The polymer compound of claim 1, wherein the polymer compound comprises a repeating unit represented by at least one of Formula 2-1 or Formula 2-2:

14. A solid electrolyte film comprising, the polymer compound according to claim 1.

15. The solid electrolyte film of claim 14, wherein the solid electrolyte film has an ionic conductivity of greater than or equal to about $4 \times 10^{-6}$ Siemens per centimeter at 60° C.

16. The solid electrolyte film of claim 14, wherein the solid electrolyte film has an electrochemical window of about 2 volts to about 4.5 volts.

17. A lithium-air battery comprising:
   a positive electrode;
   a negative electrode; and
   a solid electrolyte film between the positive electrode and the negative electrode,
   wherein the solid electrolyte film comprises the polymer compound of claim 1.

18. The lithium-air battery of claim 17, wherein the solid electrolyte film and the positive electrode are in contact with each other.

19. The lithium-air battery of claim 17, further comprising an oxygen blocking film between the solid electrolyte film and the negative electrode.

20. The lithium-air battery of claim 19, wherein the solid electrolyte film and the oxygen blocking film are in contact with each other.

* * * * *